US009446463B2

(12) United States Patent
Suruga et al.

(10) Patent No.: US 9,446,463 B2
(45) Date of Patent: Sep. 20, 2016

(54) TAP HOLDER

(75) Inventors: Hirokazu Suruga, Nara (JP);
Hidemori Kawashita, Nara (JP)

(73) Assignee: Daishowa Seiki Kabushiki Kaisha, Higashiosaka-shi, Osaka (JP)

( * ) Notice: Subject to any disclaimer, the term of this patent is extended or adjusted under 35 U.S.C. 154(b) by 208 days.

(21) Appl. No.: 14/129,415

(22) PCT Filed: Jun. 29, 2011

(86) PCT No.: PCT/JP2011/064942
§ 371 (c)(1),
(2), (4) Date: Feb. 20, 2014

(87) PCT Pub. No.: WO2013/001624
PCT Pub. Date: Jan. 3, 2013

(65) Prior Publication Data
US 2014/0159322 A1   Jun. 12, 2014

(51) Int. Cl.
*B23G 1/46*   (2006.01)
*B23B 31/08*   (2006.01)

(52) U.S. Cl.
CPC .............. *B23G 1/46* (2013.01); *B23B 31/083* (2013.01); *B23B 2231/54* (2013.01); *Y10T 279/17* (2015.01); *Y10T 408/95* (2015.01)

(58) Field of Classification Search
CPC ... B23B 2231/54; B23B 31/083; B23G 1/46; Y10T 408/94; Y10T 408/95; Y10T 408/953; Y10T 408/73; Y10T 279/17017; Y10T 279/17025; Y10T 279/17
USPC ......... 408/238, 239 R, 141, 240; 279/16, 17, 279/9.1; 470/183, 198, 903
See application file for complete search history.

(56) References Cited

U.S. PATENT DOCUMENTS 2,371,330 A * 3/1945 Irstad .................. B23B 31/08
                                              279/16
2,540,513 A   2/1951 Dodd
(Continued)

FOREIGN PATENT DOCUMENTS

CN    86102790 A    10/1986
CN    1880009 A    12/2006
(Continued)

OTHER PUBLICATIONS

Office Action of the Chinese corresponding application No. 201180071822.3 mailed May 21, 2015.
(Continued)

*Primary Examiner* — Daniel Howell
*Assistant Examiner* — Nicole N Ramos
(74) *Attorney, Agent, or Firm* — Muncy, Geissler, Olds & Lowe, P.C.

(57) ABSTRACT

Provided is a tap holder configured so that compression-side elastic characteristics and tension-side elastic characteristics are different from each other with utilization of an elastic member for absorbing synchronization error in rotation and feeding of a spindle of a machine tool. The tap holder includes a chuck 20 for holding a tap P, and a holder body 10 for holding the chuck 20 so that the chuck 20 is movable along a rotational axis X and rotatable in synchronism with the chuck 20. The tap holder further includes elastically deforming members 31, 32, 33 provided in a tension direction and a compression direction, respectively and deformable between the chuck 20 and the holder body 10 when a tension force or a compression force is applied to the tap P along the direction of the rotational axis X, and a deformation reducing mechanism 29 for the elastically deforming members 31, 32, 33 such that a deformation amount along the rotational axis X generated in at least one elastically deforming member 31, 32 of the elastically deforming members 31, 32, 33 disposed respectively in the tension direction and the compression direction is smaller than an amount of displacement of the chuck 20 along the rotational axis X.

2 Claims, 7 Drawing Sheets

(56) References Cited

U.S. PATENT DOCUMENTS

| | | | | |
|---|---|---|---|---|
| 2,570,752 | A * | 10/1951 | Benjamin | B23B 31/08 279/133 |
| 3,178,739 | A * | 4/1965 | Plummer | B23G 1/46 408/141 |
| 3,220,031 | A * | 11/1965 | Supernor | B23G 1/46 408/141 |
| 3,553,753 | A * | 1/1971 | Hundley | B23B 31/38 279/16 |
| 4,014,622 | A * | 3/1977 | Lotz | B23B 31/08 279/133 |
| 4,082,472 | A * | 4/1978 | Mossner | B23B 31/08 279/16 |
| 4,111,442 | A * | 9/1978 | Wawrzyniak | B23B 31/08 279/16 |
| 4,396,317 | A * | 8/1983 | Staron | B23Q 1/0036 279/20 |
| 5,054,974 | A | 10/1991 | Wallach | |
| 5,538,371 | A * | 7/1996 | Kubo | B23G 1/465 192/21 |
| 5,915,892 | A * | 6/1999 | Glimpel | B23B 31/083 279/16 |
| 6,348,003 | B1 * | 2/2002 | Johnson | B23B 31/08 408/141 |
| 2006/0285933 | A1 * | 12/2006 | Johnson | B23G 1/46 408/141 |
| 2008/0185793 | A1 * | 8/2008 | Haimer | B23B 31/028 279/2.06 |
| 2009/0209356 | A1 | 8/2009 | Komine et al. | |
| 2009/0324351 | A1 | 12/2009 | Komine et al. | |

FOREIGN PATENT DOCUMENTS

| | | |
|---|---|---|
| CN | 101479069 A | 7/2009 |
| DE | 19725950 A1 | 12/1998 |
| DE | 202008004935 U1 | 6/2008 |
| GB | 942071 A | 11/1963 |
| JP | 49-47264 Y1 | 12/1974 |
| JP | S5467277 A | 5/1979 |
| WO | 2008/053606 A1 | 5/2008 |
| WO | 2008/105043 A1 | 9/2008 |

OTHER PUBLICATIONS

English Translation of International Search Report of PCT/JP2011/064942.

English Translation of the International Preliminary Report on Patentability of PCT/JP2011/064942.

Supplementary European Search Report of EP 11 86 8657.

* cited by examiner

TAP HOLDER

CROSS REFERENCE TO RELATED APPLICATIONS

The present application is a U.S. national stage of PCT/JP2011/064942 filed on Jun. 29, 2011, the disclosure of which is incorporated herein by reference.

TECHNICAL FIELD

The present invention relates to a tap holder holding a tap and attached to a spindle of a machine tool for effecting a female thread machining in association with rotation of the spindle.

BACKGROUND ART

When a machine tool effects a tapping with utilization of synchronization of a axial feeding and a rotation of a spindle of the machine tool, the rotation of the spindle and a feeding movement amount of the axis of the spindle are controlled to be synchronized with a pitch of the tapping. In an actual machining; however, due to e.g. a phenomenon called "servo delay", an error sometimes occurs in the pitch of the tapping with failure of synchronism between tap rotation and axial feeding. Conventionally, this was prevented by providing floats on axially opposed sides of the tap holder. In recent years, thanks to improvement in (synchronizing) precision in the synchronization between the rotation and axial feeding, attributable to development in the mechanism and/or control technique, there is provided a float-less integral configuration.

Notwithstanding, despite the improvement in the synchronizing precision of the machine tool, when the axial feeding direction and the rotational direction are changed for e.g. detaching the tap from an object to be machined, there can occur mismatch of rotation of the spindle relative to the feeding of the spindle, which makes it impossible to eliminate completely occurrence of a minor movement of the tap in the axial direction, which in turn would result in inadvertent enlargement of the tapping hole or deterioration in the machining performance.

As an arrangement for absorbing the above-described synchronization error, there has been proposed an arrangement in which a chuck (a tap collet) is clamped along the axial direction to a bottom face of an attachment recess of a holder body and a fastener nut via an elastic member. With provision of such elastic member, there will occur a small movement in the axial direction between the holder body and the chuck, which movement can absorb synchronization error between the axial feeding and rotation of the spindle of the machine tool.

PRIOR ART DOCUMENT

Patent Document

Patent Document 1: WO2008/105043

DISCLOSURE OF THE INVENTION

Problem to be Solved by Invention

However, with the arrangement disclosed in Patent Document 1, when the chuck is displaced in the axial direction as the tap receives a tension force toward the leading end side of the tap holder or a compression force toward the insertion side of the chuck, the elastic member will be compressed by a same amount as the amount of displacement of the chuck. For this reason, the elastic force generated in response to the application of the tension force toward the leading end side of the tap holder will become equal to the elastic force generated in response to the application of the compression force toward the insertion side of the chuck, thus failing to take into consideration bite-in of the tap into an object to be machined at the time of starting of the machining or protection of the machined face after the machining. As a result, the machining precision may deteriorate.

In an arrangement wherein a tap holder corresponding to a spindle of a machine tool comprises a holder body and a chuck separated from each other, the object of the present invention is to provide a tap holder configured such that compression-side elastic characteristics and tension-side elastic characteristics are different from each other with utilization of an elastic member for absorbing synchronization error in rotation and feeding of a spindle of a machine tool.

Means for Achieving the Object

According to a first characterizing feature of a tap holder relating to the present invention, the tap holder comprising a chuck for holding a tap and a holder body for holding the chuck so that the chuck is movable along a rotational axis and rotatable in synchronism with the chuck, the tap holder comprises:

each elastically deforming members provided in a tension direction and a compression direction, respectively and deformable between the chuck and the holder body when a tension force or a compression force is applied to the tap along the direction of the rotational axis; and a deformation reducing mechanism for the elastically deforming member such that a deformation amount along the rotational axis generated in at least either one of the elastically deforming members disposed respectively in the tension direction and the compression direction is smaller than an amount of displacement of the chuck along the rotational axis.

With the above arrangement, even when the chuck is displaced as the tap receives a tension force or a compression force, in order to allow or stop the displacement of the chuck, the tap holder includes a deformation reducing mechanism for rendering a deformation amount of the elastic member smaller than a displacement mount of the chuck along the rotational axis. That is, by rendering at least one elastic member less deformable, there is provided a difference in the compression-side elastic characteristics and the tension-side elastic characteristics. With this arrangement, at the time of start of a machining, there is provided improvement in the bite-in performance of the tap into the object to be machined, so that a favorable threaded portion can be formed even immediately after the start of machining. Whereas, at the time of detachment of the tap after the machining, there is ensured a large displacement amount for the tap in the axial direction, thus effectively protecting the machined shape of the object to be machined, so that the machining precision is made extremely good.

Incidentally, the term: "elastic characteristics" refers to a degree of increase of elasticity relative to a displacement amount of the tap when the tap receives a compression force or a tension force.

According to a second characterizing feature of the tap holder relating to the present invention, the deformation reducing mechanism comprises an arrangement in which multiple elastic members can be disposed in series between the chuck and the holder body in either the tension direction or the compression direction when the chuck is deformed in either the tension direction or the compression direction relative to the holder body.

With the above-described arrangement in which multiple elastic members can be disposed in series, it is possible to appropriately set an elastic member to be disposed at a position of a pressure receiving face that acts when a compression force is applied to the chuck and an elastic member that acts when a tension force is applied to the same. Thus, it is readily possible to set the elasticity in the case of application of a compression force and the elasticity in the case of application of a tension force.

Further, with the arrangement of disposing elastic members in series, with using elastic members of a same size, a tap holder capable of coping with possible variations in the compression/tension force can be constructed in a rational manner.

According to a third characterizing feature of the tap holder relating to the present invention, the deformation reducing mechanism comprises a retainer comprised of a tubular member interposed between the holder body and the chuck, the retainer including a plurality of ball members caused to act in the direction of the rotational axis and disposed along a circumferential direction relative to the rotational axis and in contact with an inner face of the holder body and an outer face of the chuck.

With the above arrangement, as the retainer has the above shape, when the chuck is displaced in the direction of rotational axis, the retainer will move with the ball members being rotated in the direction opposite the direction of the displacement of the chuck. With this, the displacement amount of the retainer is made smaller than the displacement amount of the chuck, and it is possible even to make the displacement amount of the retainer a half of the displacement amount of the chuck. And, through adjustment of the length of the retainer in the direction of the rotational axis, it is possible to adjust the deformation amount in the rotational axis direction when the elastic member near the retainer receives a compression force or a tension force. Consequently, displacement adjustment of the tap along the rotational axis direction can be carried out extremely smoothly. Further, the above-described function and arrangement can be provided in an efficient manner in the limited space available between the holder body and the chuck, so that the tap holder can be formed very compact.

According to a fourth characterizing feature of the holder tap relating to the present invention, the deformation reducing mechanism is configured such that either one of a pressure receiving face of the chuck and a pressure receiving face of the holder body whichever may come into contact with the elastically deforming member is formed perpendicular relative to the rotational axis and the other one thereof is formed with an inclination in the direction of the rotational axis.

With the above arrangement in which one of the two pressure receiving faces pressing the elastic member is formed perpendicular relative to the rotational axis and the other is formed with an inclination in the direction of the rotational axis, when the volume of the space accommodating the elastic member is noted, the volume of the space is made larger than a case wherein both of the pressure receiving faces are formed perpendicular relative to the rotational axis. More particularly, in an area on the side where the inclined face extends away from the elastic member relative to the position at which the inclined pressure receiving face contacts the elastic member, a large space is formed between the inclined pressure receiving face and the elastic member. When the chuck is displaced in the compression direction or tension direction parallel with the rotational axis, the volume of the space accommodating the elastic member is reduced by the displacement of the chuck. This reduced volume remains the same as long as the displacement amount of the chuck remains the same, in either the case of the inclined pressure receiving face being formed perpendicular relative to the rotational axis or the case of the face being formed with an inclination. However, as described above, the initial volume accommodating the elastic member is large in the case of the pressure receiving face being inclined. Therefore, on the side of the pressure receiving face being inclined, the degree of compression received by the elastic member is smaller. To put it the other way around, if the elastic member is compressed by a substantially equal degree, in the case of the pressure receiving face being inclined, as compared with the case of the member being perpendicular, the displacement amount of the chuck will be greater.

As described above, by means of an angle of the pressure receiving face too, the elastic characteristics of the elastic member can be made different between the time of compression of the chuck and the time of tension of the chuck; thus, the machining precision for the object to be machined can be improved.

MODES OF EMBODYING THE INVENTION

First Embodiment

Next, an embodiment of a tap holder relating to the present invention will be explained with reference to the drawings.

[General Construction]

Figure 1:
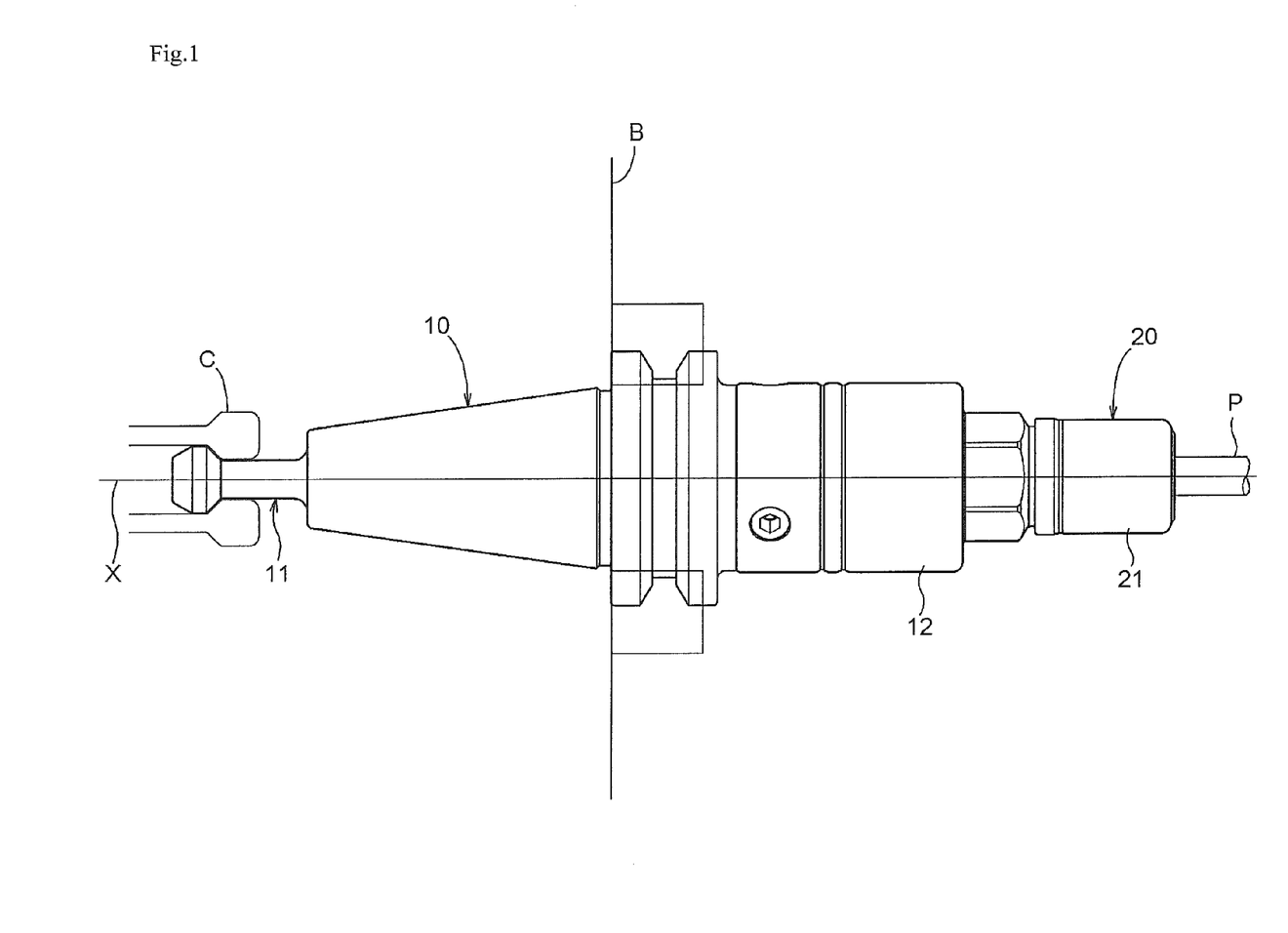
FIG. 1 is a side view of a tap holder relating to the present invention.

The tap holder relating to this embodiment is for use in attaching a tap to a machine tool having a tap synchronized feeding mechanism. As shown in FIG. 1, the tap holder includes a holder body 10 inserted and supported to a spindle B of a machine tool, a pull bolt 11 formed at a rear end portion, which is an insertion side, of the holder body 10, and a chuck 20 holding a tap P at the leading end thereof and attached to the leading end side of the holder body 10. The holder body 10 is rotatably drivable about a rotational axis X as "a center axis", by means of an unillustrated motor mounted on the spindle B of the machine tool. The pull stud bolt 11 includes an outer circumferential face which is formed concave and clamped by a clamp C on the side of the spindle B of the machine tool. Further, the holder body 10 is configured to thrust-hold the chuck 20 to be rotatable in synchronism with the chuck 20 and the chuck 20 is configured to be movable along the rotational axis X relative to the holder body 10. In the following, in the tap holder, its portion on the side of the pull bolt 11 will be referred to as "a rear end side" and its portion on the side of the tap P will be referred to as "a leading end side", respectively.

Figure 2:
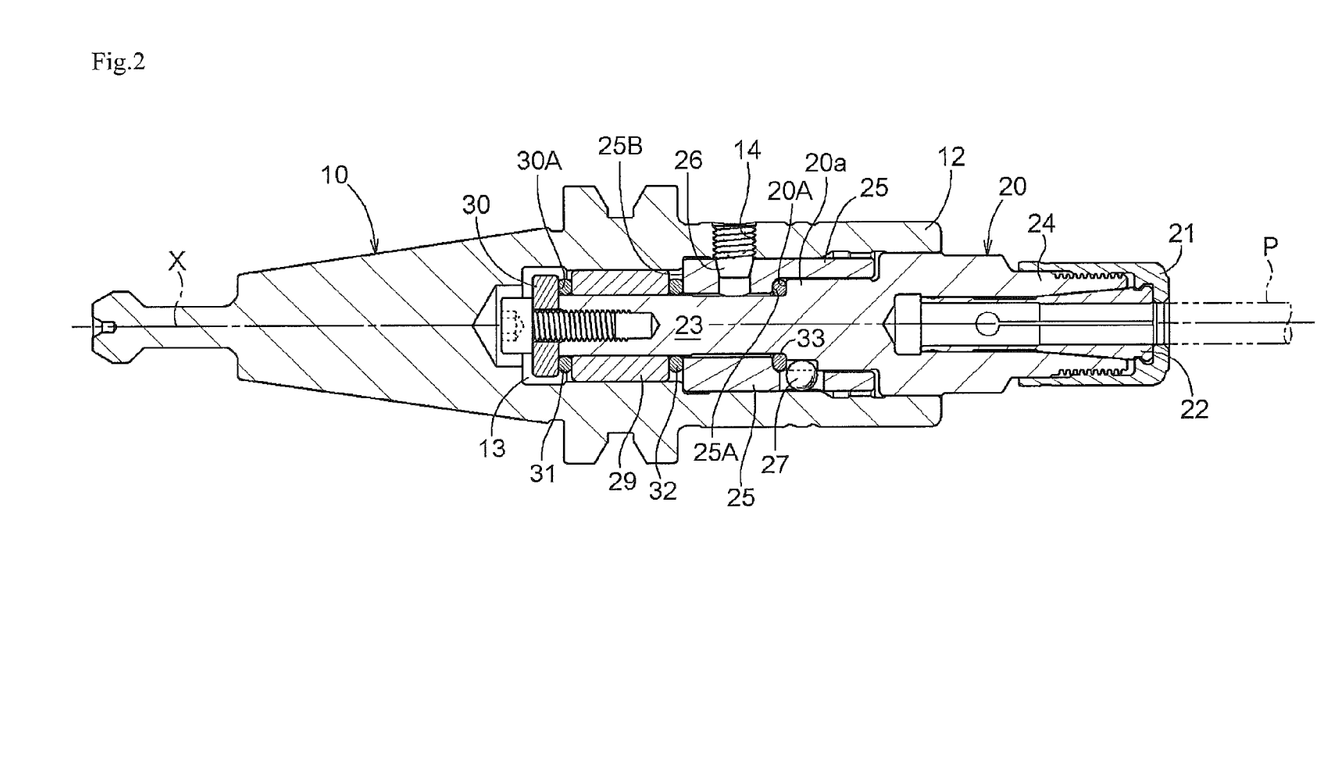
FIG. 2 is a side view in section of the tap holder.

As shown in FIG. 2, on the leading end side of the chuck 20, there are provided a tubular fastener nut 21 and a tubular collet 22. The fastener nut 21 is fitted on the chuck 20 to be externally threadable thereon. As the fastener nut 21 is fastened progressively, the fastener nut 21 is moved along the direction of the rotational axis X. The collet 22 is retained to be rotatable relative to the fastener nut 21 and inserted within the chuck 20 to be slidable along the rotational axis X. The collet 22 defines multiple slits along the direction of the rotational axis X. In association with progressive fastening of the fastener nut 21, the collet 22 will be inserted without being rotated relative to the chuck 20 and will be reduced in its diameter as being flexed in the inner radial direction due to the wedge action provided by a tapered face inside the chuck 20. With this diameter reduction, the whole circumference of the tap P inserted in the collet 22 can be clamped in a uniform manner.

The holder body 10 includes an outer tubular portion 12 on the leading end side and in this outer tubular portion 12, there is formed an attaching recess 13 for the chuck 20. The chuck 20 includes a shaft portion 23 inserted as being slid with keeping tight contact with the inner circumferential face of the attaching recess 13 of the holder body 10, and a tubular chuck holding portion 24 provided on the leading end side of the shaft portion 23. Further, within the holder body 10, there is formed a passageway (not shown) for pressure-feeding cutting liquid and this passageway is opened to the attaching recess 13.

A through hole 14 is formed along the radial direction of the outer tubular portion 12 to extend through from the outer face of the outer tubular portion 12 of the holder body 10 to the attaching recess 13. A tubular support member 25 is disposed from an axially intermediate position of the shaft portion 23 of the chuck 20 toward the leading end side, and at a position corresponding to the through hole 14 provided in the holder body 10, there is provided a through hole 26 extending through radially. Then, as a retainer member (not shown) is inserted to the through hole 14 and the through hole 26, the support member 25 is fixed to the holder body 10.

Between the support member 25 fixed to the holder body 10 and the shaft portion 23 of the chuck 20, there are disposed key balls 27 for guiding the sliding of the chuck 20 in the axial direction and preventing rotation of the chuck 20 relative to the holder body 10. The key balls 27 are fitted in a plurality of concave grooves defined along the inner circumference of the tubular portion of the support member 25 and spaced apart from each other by predetermined intervals.

On the shaft portion 23 of the chuck 20 on the rear end side of the support member 25, a retainer 29 is disposed. The retainer 29 is a tubular member interposed between the holder body 10 and the chuck 20. At the rear end side of the shaft portion 23, a ring-like stopper member 30 having a larger diameter than the shaft portion 23 is fixedly attached by means of a screw member in the axial direction.

In the direction of the rotational axis X, a cylindrical pressure receiving face 30A of the stopper member 30 is in opposition to a pressure receiving face 25B on the rear end side of the support member 25 and a pressure receiving face 25A on the leading end side of the support member 25 is in opposition to a pressure receiving face 20A on the rear end side of a large diameter portion 20a of the chuck 20. In operation, when the chuck 20 is displaced in a tension direction toward the leading end side, the pressure receiving face 30A will approach the pressure receiving face 25B. Whereas, when the chuck 20 is displaced in a compression direction toward the rear end side, the pressure receiving face 20A will approach the pressure receiving face 25A.

Between the stopper member 30 and the retainer 29 and between the retainer 29 and the support member 25, there are respectively disposed elastic members 31, 32 as elastically deforming members. Further, in the axial direction of the shaft portion 23 of the chuck 20, between the support member 25 and the large diameter portion 20a of the shaft portion 23, there is disposed an elastic member 33 as an elastically deforming member. The elastic members 31, 32, 33 attenuate or reduce the relative displacement between the chuck 20 and the holder body 10 when a tensile force or a compression force is applied along the direction of the rotational axis X to the tap P. The elastic members 31, 32, 33 are members having elasticity made of a hard synthetic resin such as nylon, rubber, or the like and are constituted of e.g. O-rings. The retainer 29 acts as a spacer between the elastic members 31, 32 interposed between the pressure receiving face 30A and the pressure receiving face 25B in opposition to each other and the retainer 29 is movable relative to the holder body 10.

In this way, along the direction of the rotational axis X, between the stopper member 30 and the large diameter portion 20a, from the side of the stopper member 30, the elastic member 31, the retainer 29, the elastic member 32, the support member 25 and the elastic member 33 are disposed in this mentioned order. The elastic members 31, 32, 33, the retainer 29 and the support member 25 are mounted such that the elastic members 31, 32, 33 may be placed under predetermined compressed states, when no external force is applied to the tap P, i.e. a condition prior to a tapping, as illustrated in FIG. 2.

[Action when Compression Force is Applied to Chuck in Axial Direction]

Figure 3:
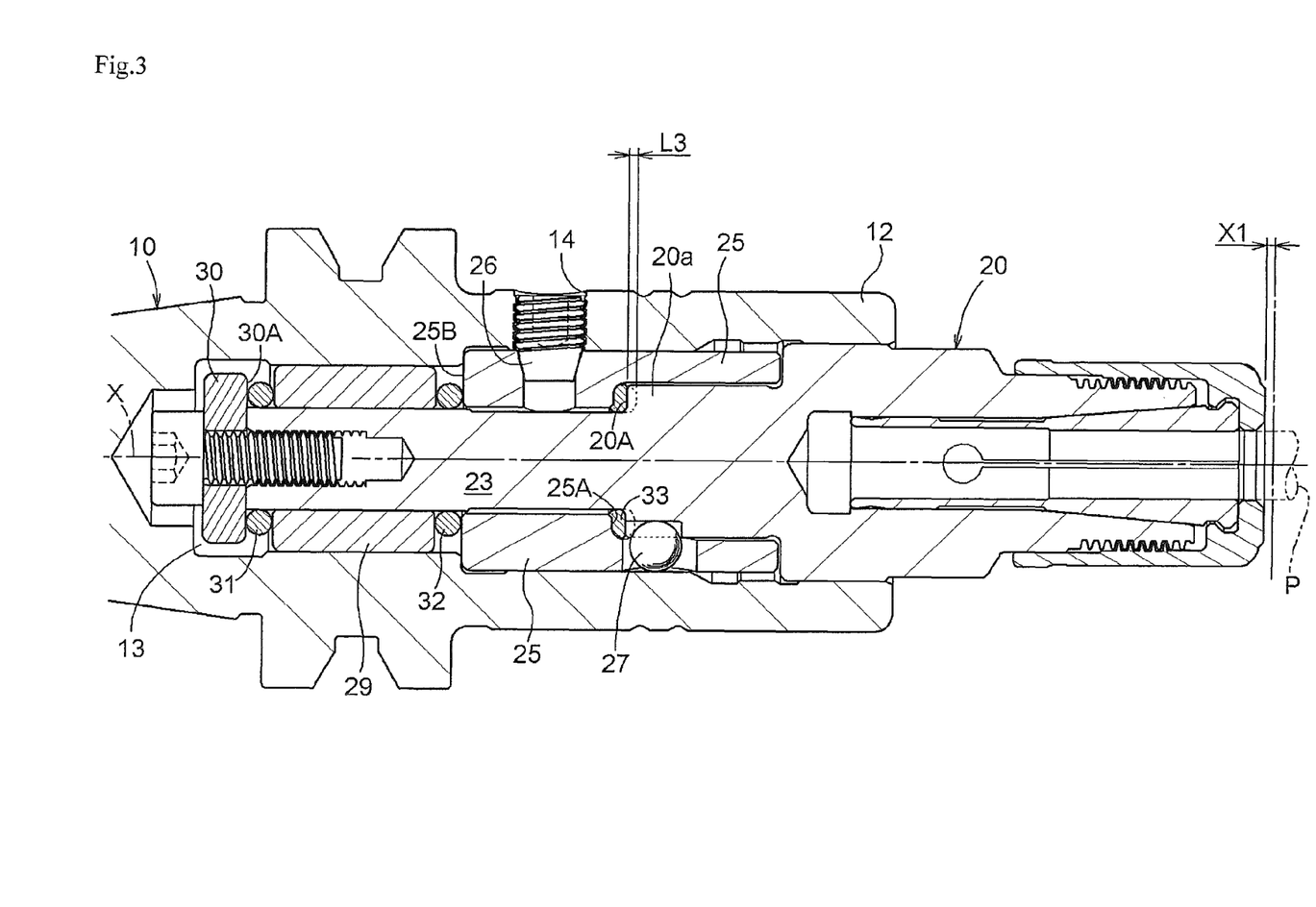
FIG. 3 is a side view in section of the tap holder under a condition when a compression force is applied to a chuck.

For example, at an early stage of a tapping etc., when the tap P attached to the tap holder is exposed to a compression force in the direction of the rotational axis X due to a reaction force from an object to be machined, the chuck 20 will be displaced in the compression direction toward the rear end side. In the course of this, as shown in FIG. 3, the pressure receiving face 20A will approach the pressure receiving face 25A and the elastic member 33 will be deformed. That is, a displacement amount X1 of the chuck 20 along the direction of the rotational axis X toward the rear end side will be absorbed by the deformation of the elastic member 33 and a deformation amount L3 of the elastic member 33 in the direction of the rotational axis X will be equal to the displacement amount X1 of the chuck 20.

[Action when Tension Force is Applied to Chuck in Axial Direction]

Figure 4:
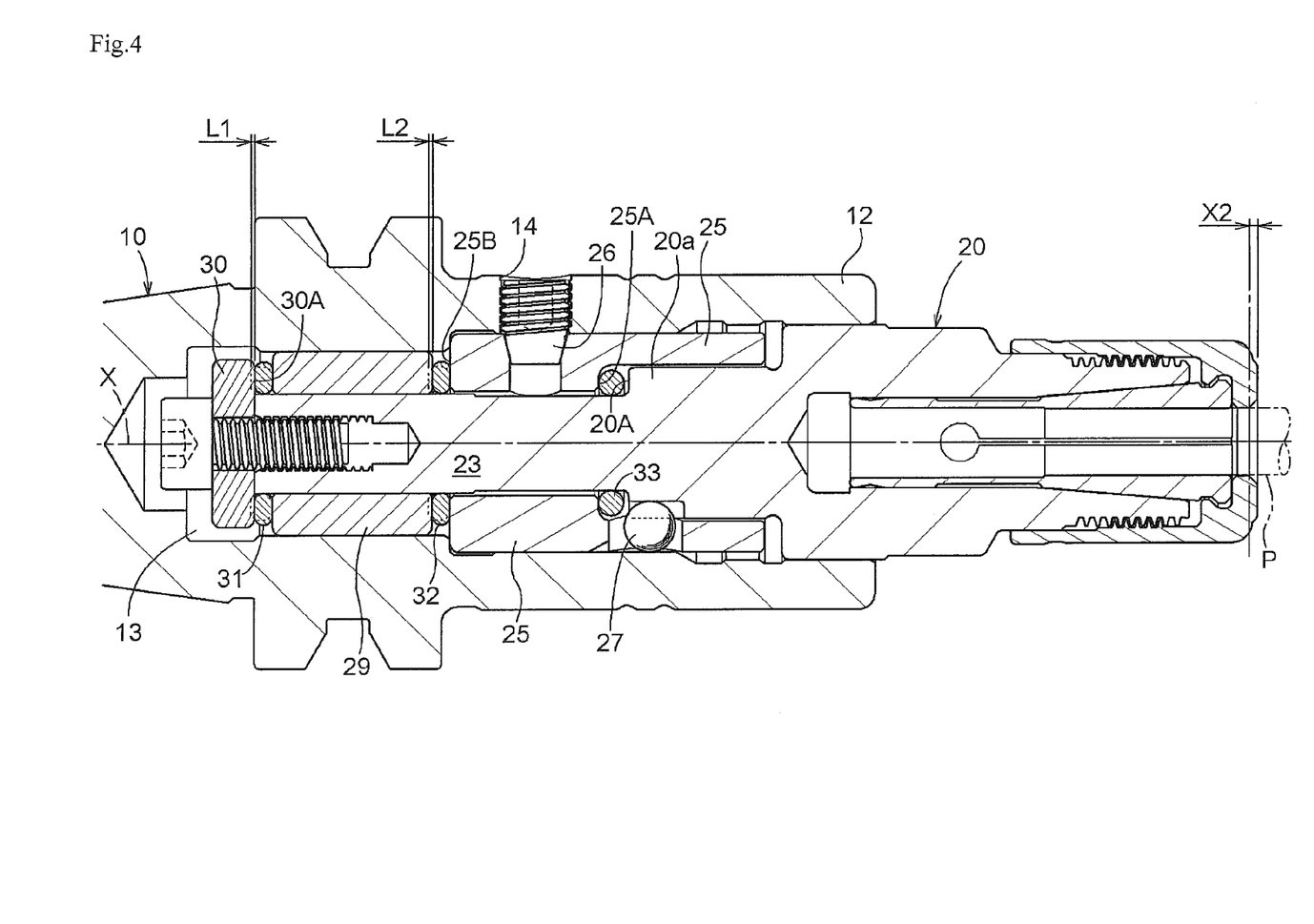
FIG. 4 is a side view in section of the tap holder under a condition when a tension force is applied to the chuck.

For example, at the time of completion of a tapping etc., when the tap P is exposed to a tension force in the direction of the rotational axis X in association with changes of the axial feeding direction and the rotational direction in order to detach the tap P attached to the tap holder from an objet to be machined, the chuck 20 will be displaced in the tension direction toward the leading end side. In the course of this, as shown in FIG. 4, the pressure receiving face 30A will approach the pressure receiving face 25B and the retainer 29 will be moved along the direction of the rotational axis X and the elastic members 31, 32 will be deformed substantially equally. That is, a displacement amount X2 of the chuck 20 along the direction of the rotational axis X toward the leading end side will be absorbed by the deformations of the elastic members 31, 32, and each of the deformation amounts L1, L2 of the elastic members 31, 32 in the direction of the rotational axis X will be a half the displacement amount X2 of the chuck 20.

When the tap P is detached from the object to be machined with changes of the axial feeding direction and the rotational direction, the tapping to the object to be machined has been completed. Therefore, the tension force applied to the chuck 20 will be smaller than the compression force applied thereto.

In the instant embodiment, an arrangement is provided such that each of the deformation amounts L1, L2 of the elastic members 31, 32 which are deformed in order to allow a displacement of the chuck 20 when the tap P is displaced relative to this chuck 20 may be smaller than the displacement amount X1 of the chuck 20. Accordingly, the elastic members 31, 32, with the reduction in their deformation amounts L1, L2, can be set such that the compression side elasticity characteristics and the tension side elasticity characteristics may be different from each other. As a result, the bite-in performance of the tap P to an object to be machined at the time of start of a machining is improved; and also it is possible to avoid inconvenience such as excessive machining of the object to be machined by the tap P when the tap P is detached after completion of the machining, whereby the machining precision can be enhanced.

The plurality of elastic members 31, 32 are disposed in series via the retainer 29 as a spacer interposed therebetween. Therefore, it is possible to appropriately set the number of elastic member(s) that act(s) when a compression force is applied to the chuck 20 and the number of elastic member(s) that act(s) when a tension force is applied to the chuck 20. Thus, the elasticity characteristics in the case of application of a compression force and the elasticity characteristics in the case of application of a tension force can be set easily.

Further, with the arrangement of disposing multiple elastic members in series, it is possible to employ elastic members of a same size. Hence, it is possible to reasonably configure a tap holder capable of coping with variations in the compression/tension force.

In the instant embodiment, a deformation reduction mechanism for the elastic members 31, 32 is constructed by arranging the retainer 29 between the plurality of elastic members 31, 32 mounted between the mutually opposed pressure receiving faces 30A, 25B. The retainer 29 is movable relative to the holder body 10 in the direction of the rotational axis X. Accordingly, when the elastic member 31, 32 is exposed to a compression force in the direction of the rotational axis X, it is possible to cause a face of the retainer 29 to come into contact with the elastic member 31, 32 at a desired angle. In the instant embodiment, the face of the retainer 29 is perpendicular to the direction of the rotational axis X. Therefore, if the multiple elastic members 31, 32 were mounted without provision of the retainer 29 as a spacer, there would arise the risk of positional displacement in the radial direction between the elastic members in association with deformations of the elastic members 31, 32. However, with the provision of the retainer 29 as a spacer, the elastic members 31, 32 can be compressively deformed to appropriate states, so that the desired compression/tension characteristics can be achieved. Incidentally, the construction as the spacer is not limited to the retainer 29. The shape can be any as long as it can be mounted between multiple elastic members disposed between mutually opposed pressure receiving faces 30A, 25B and it is movable relative to the holder body 10.

Yet, when the retainer 29 having the above-described construction is employed as a spacer between the elastic member 31 and the elastic member 32 as provided in the instant embodiment, it is possible to realize the movement of the chuck 20 in the direction of the rotational axis X. And, through adjustment of the length of the retainer 29 in the direction of the rotational axis X, it is possible to adjust the deformation amount in the direction of the rotational axis X when the elastic member near the retainer 29 receives a compression force or a tension force. As a result, displacement adjustment of the tap P along the direction of the rotational axis X can be carried out extremely smoothly. Further, such function and arrangement can be provided in an efficient manner in the limited space available between the holder body 10 and the chuck 20, whereby the tap holder can be formed very compact.

Second Embodiment

Figure 5:
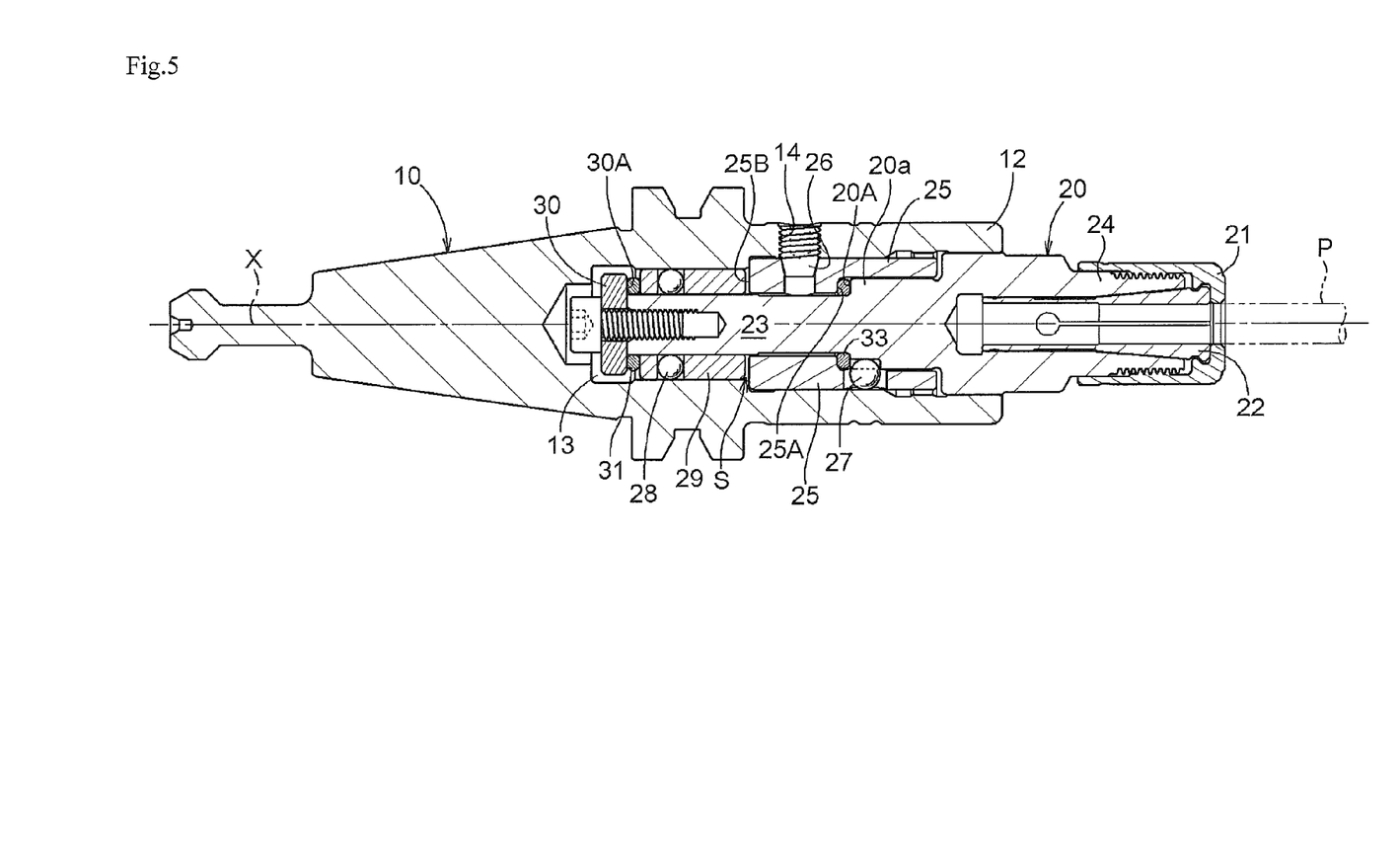
FIG. 5 is a side view in section showing a tap holder according to a second embodiment.

In this embodiment, as shown in FIG. 5, the elastic member acting in the tension direction is constituted of only the elastic member 31. The condition illustrated in FIG. 5 is a condition wherein the elastic member 31 and the elastic member 32 are not yet exposed to any external force, e.g. a condition at the moment when a machining of an object to be machined by the tap has been just started. Under this condition, a gap S is formed between the retainer 29 and the support member 25.

In the shaft portion 23 of the chuck 20, on the rear end side of the support member 25, a retainer 29 is disposed. The retainer 29 is a tubular member interposed between the holder body 10 and the chuck 20. The retainer 29 includes a plurality of ball members 28 mounted within a plurality of through holes defined along the circumferential direction relative to the rotational axis X with predetermined intervals. The multiple ball members 28 contact the inner face of the holder body 10 and the outer face of the chuck 20, thus holding the chuck 20 coaxially relative to the holder body 10 and causing the chuck 20 to act in the direction of the rotational axis X.

Figure 6:
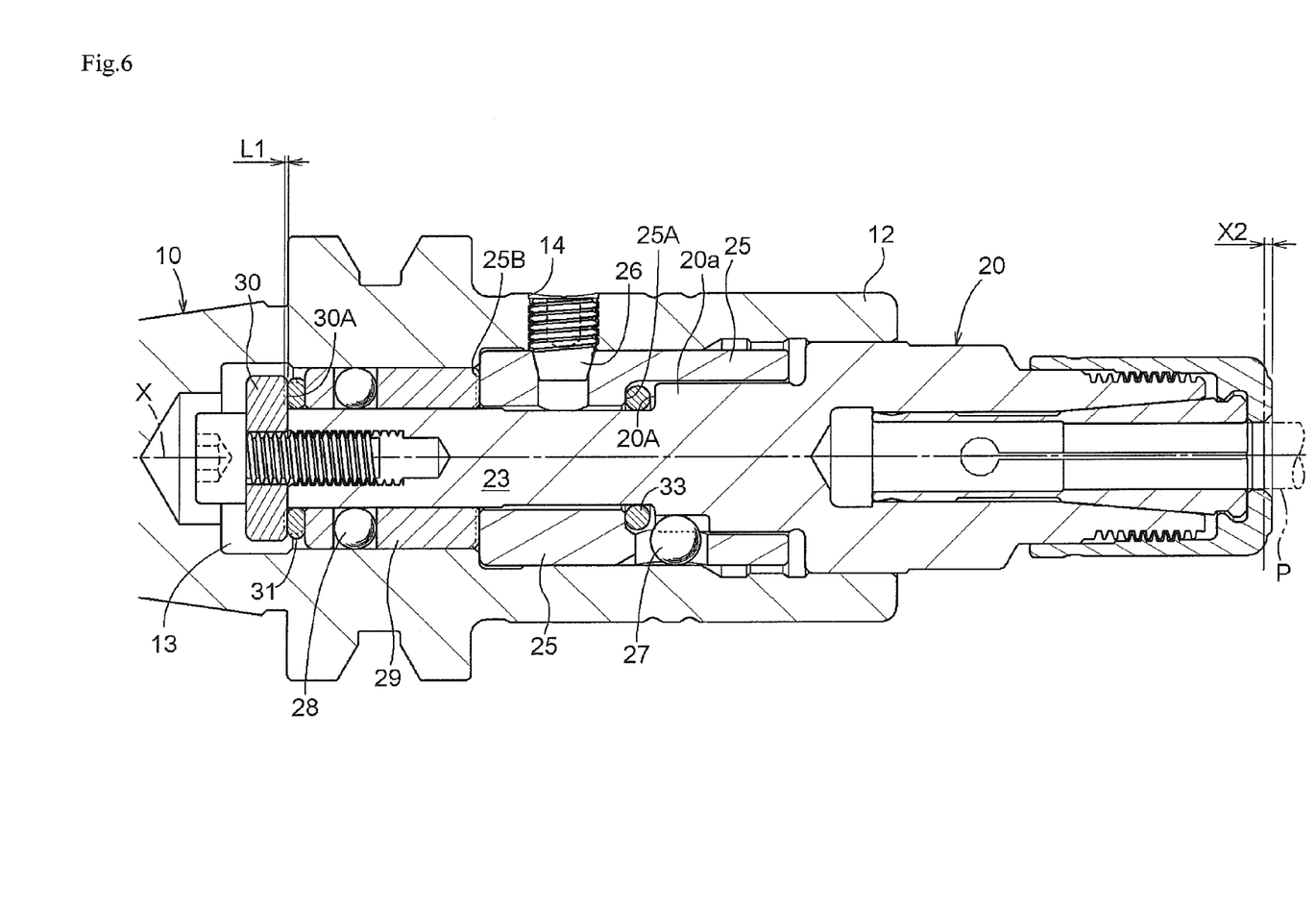
FIG. 6 is a side view in section showing a condition when a tension force is applied to a chuck in the second embodiment.

As shown in FIG. 6, when the chuck 20 is displaced toward the leading end side in the direction of the rotational axis X for example, the retainer 29 too is displaced toward the leading end side. In this, if no slippage occurs in the ball members 28, the retainer 29 will be moved toward the rear end side with rotation of the ball members 28. With this, the displacement amount of the retainer 29 is made smaller than a displacement amount X2 of the chuck 20. In the instant embodiment, an arrangement is provided such that the displacement amount of the retainer 29 may be a half the displacement amount X2 of the chuck 20. Accordingly, the deformation amount L1 of the elastic member 31 in the direction of the rotational axis X too will be a half the displacement amount X2 of the chuck 20.

Third Embodiment

Figure 7:
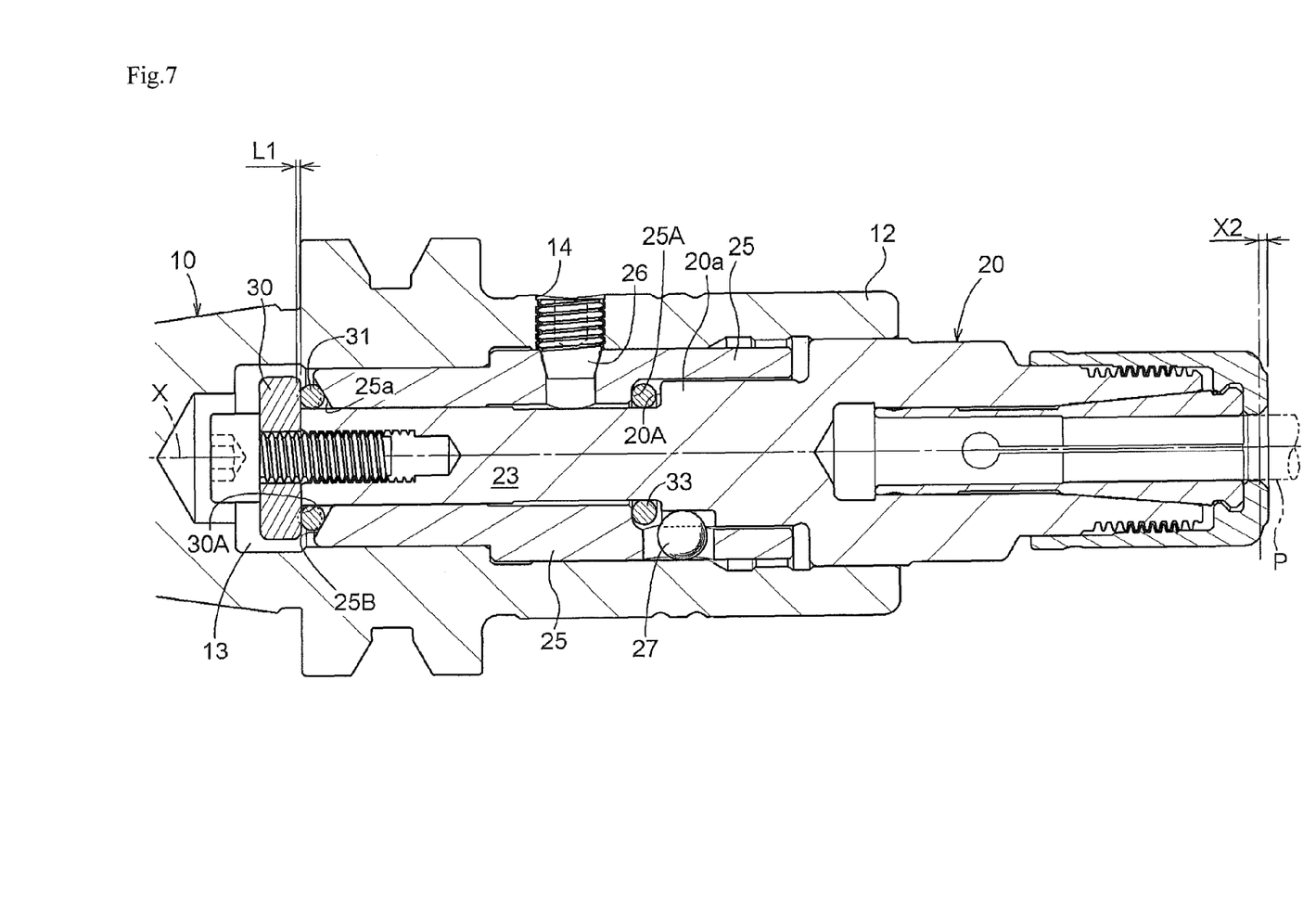
FIG. 7 is a side view in section showing a condition when a tension force is applied to a chuck in a third embodiment.

In the instant embodiment, as shown in FIG. 7, a deformation amount reducing mechanism is constituted by forming an inclined portion 25a inclined toward the direction of the rotational axis X in the pressure receiving face 25B of the support member 25 in contact with the elastic member 31 as an elastic member.

More particularly, of the two pressure receiving faces 30A, 25B pressing the elastic member 31, one 30A is formed perpendicular relative to the rotational axis X, whereas the other pressure receiving face 25B is formed with an inclination toward the rotational axis X. With this, the volume of the space accommodating the elastic member 31 is increased, as compared with a case where both the pressure receiving faces 30A, 25B are formed perpendicular to the rotational axis X. That is, relative to the position where the inclined pressure receiving face 25B contacts the elastic member 31, at the area where the inclined portion 25a extends away from the elastic member 31, that is, on the side of the rotational axis X, a large space is formed between the inclined pressure receiving face 25B and the elastic member 31. When the chuck 20 is displaced in the compression direction or the tension direction in parallel with the rotational axis X, the volume of the space accommodating the elastic member 31 is reduced by the displacement of the chuck 20. This decreased volume will remain the same whether the inclined pressure receiving face 25B is perpendicular to the rotational axis X or the face is inclined relative thereto, as long as the displacement amount of the chuck 20 remains the same. However, as described above, in the case of the inclined pressure receiving face, the original volume of the space accommodating the elastic member 31 is greater. Therefore, on the side of the inclined pressure receiving face 25B, the degree of compression received by the elastic member 31 is smaller. To put it the other way around, if the elastic member 31 is compressed by a substantially same degree, the displacement amount of the chuck 20 will be greater in the case of the arrangement of the pressure receiving face being inclined than the case of the arrangement of the pressure receiving face being perpendicular.

In this way, by the angle of the pressure receiving face, the elasticity characteristics of the elastic members 31, 33 can be made different between the time of compression of the chuck 20 and the time of tension of the chuck 20, whereby the machining precision for an object to be machined can be improved.

Incidentally, the forming portion of the inclined portion can be the pressure receiving face 30A on the side of the chuck 20, rather than the pressure receiving face 25B of the support member 25.

As shown in FIG. 7, the pressure receiving faces 20A, 25A accommodating the elastic member 33 therebetween and opposed to each other are perpendicular to the rotational axis X. Regarding the elasticity characteristics in this case, the increase in the degree of compression of the elastic member 33 is greater than the case of the inclined pressure receiving face 25B described above. With use of this arrangement, it is possible to render the elastic characteristics different from each other between the case of the chuck 20 being displaced toward the compression side and the case of the chuck 20 being displaced toward the tension side.

Further, inclined faces can be formed in both the compression side pressure receiving face and the tension side pressure receiving face. In this case, by making the inclinations of these faces different from each other, it is possible to set the displacement amount of the chuck 20 greater in the case when the elastic member having the greater inclination is active.

Other Embodiments (1) In the foregoing embodiments, there was shown an example wherein O rings are employed as the elastic members 31, 32, 33 acting as the elastically deforming members. However, the shape of the elastic members 31, 32, 33 is not limited to the O ring, but can be various other shapes such as sphere, cube, spheroid, etc. However, when these shaped are used, it is necessary to dispose the plurality of elastic members evenly in the circumferential direction of the rotational axis X. Further, the elastic members 31, 32 and the elastic member 33 can be formed of materials having different hardness. With this, it becomes possible to adjust individually the flexion degrees of the elastically deforming members in the case of the chuck 20 being exposed to a compression force and the case of the chuck 20 being exposed to a tension force.

(2) In the first embodiment described above, there was shown an example wherein the deformation reducing mechanism for the elastic members 31, 32 is constituted by disposing the elastic members 31, 32 in series with the spacer (retainer) 29 being disposed therebetween. Instead, the deformation reducing mechanism can be constituted by disposing the elastic member 31 and the elastic member 32 in series without any spacer being disposed therebetween.

(3) In the embodiments described above, an arrangement was provided such that the deformation amount L3 of the elastic member 33 may be equal to the displacement amount X1 of the chuck 20 when the chuck 20 is displaced as the tap P receives a compression force and also that the deformation amount L1 of the elastic member 31 may be smaller than the displacement amount X2 of the chuck 20 when the chuck 20 is displaced as the tap P receives a tension force. This is an arrangement for reducing the deformation amount of the elastic member 31 for allowing speedy displacement of the chuck 20 when the tap P receives a tension force, with taking into consideration that the tension force received by the tap P is generally smaller than the compression force received by the same.

Alternatively, it may be arranged such that the deformation amount of the elastic member receiving the tension force may be smaller than the displacement amount X2 of the chuck 20 when the chuck 20 is displaced as the tap P receives a tension force and also that the deformation amount of the elastic member receiving a compression force may be smaller than the displacement amount X1 of the chuck 20 in the case also when the chuck 20 is displaced as the tap P receives a compression force.

Incidentally, in the above case, it is necessary to set the deformation amount of the elastically deforming member which is deformed as receiving a tension force and the deformation amount of the elastically deforming member which is deformed as receiving a compression force such that the elasticity characteristics of the tension side elastically deforming member and the elasticity characteristics of the compression side elastically deforming member may be different from each other.

Further alternatively, it is possible to arrange such that the deformation amount of the compression side elastically deforming member may be smaller than the displacement amount X1 of the chuck 20 when the chuck 20 is displaced as the tap P receives a compression force and also that the deformation amount of the tension side elastically deforming member may be equal to the displacement amount X2 of the chuck 20 when the chuck 20 is displaced as the tap P receives a tension force.

(4) The deformation reducing mechanism for the elastically deforming member can be constituted by providing a link member or the like between the elastically deforming member receiving a compression force or a tension force and the shaft portion 23 of the chuck 20 and setting the side of the link member on the side of the elastically deforming member closer to a pivot axis of the link member.

INDUSTRIAL APPLICABILITY

The present invention may be applied widely to various tap holders having a chuck allowing attachment of a tap on the leading end side thereof and a holder body allowing the chuck to be movable along a rotational axis.

DESCRIPTION OF REFERENCE MARKS/NUMERALS 10 holder body
20 chuck
20A pressure receiving face
25 support member
25A, 25B pressure receiving faces
25a inclined portion
29 retainer
30 stopper member
30A pressure receiving face
31, 32, 33 elastic members (elastically deforming members)
B spindle
L1, L2, L3 deformation amounts of elastically deforming members
X rotational axis
X1, X2 displacement amounts of chuck
P tap

The invention claimed is:

1. A tap holder, comprising:
a chuck for holding a tap,
a holder body for holding the chuck so that the chuck is slidable along a rotational axis with respect to the holder body and rotatable in synchronism with the holder body defining a leading end side at which the tap is positioned and a rear end side at which the holder body is positioned in the rotational axis,
at least two elastically deforming members that are deformable,
  one of which being disposed at the rear end side compared with the other deforming member and being deformed when a tension force is applied to the tap along the rotational axis, the tension force being defined as a force that stretches the chuck while detaching the tap from an object that has been machined, and the one deforming member being defined as a rear deforming member (31),
  the other of which being disposed at the leading end side compared with the one deforming member and being deformed when a compression force is applied to the tap along the rotational axis, the compression force being defined as another force in an opposite direction from the tension force that compresses the chuck while the tap machines the object, and the other deforming member being defined as a leading deforming member (33),
a retainer constituted of a tubular member slidably disposed on the chuck and interposed between two of the deforming member and having a rear end and a leading end in the rotational axis, one of which facing the chuck and the other of which facing the holder body, wherein the rear deformation members is provided contacting the rear end of the retainer,
a gap (S), which is an empty space, is provided at the leading end of the retainer, the gap remaining when no force is applied to the tap, and
the retainer further includes a plurality of through holes defined along the circumferential direction relative to the rotational axis, and
ball members (28), each of which being disposed within one of the through holes and in contact with an inner face of the holder body and an outer face of the chuck, wherein
the retainer is to be displaced in the rotational axis by the ball members rotating in correspondence with a moving of the chuck, the moving caused by the tension force, so that a deformation amount (L1) of the rear deforming member along the rotational axis is smaller than an amount of displacement (X2) of the chuck along the rotational axis.

2. A tap holder, comprising:
a chuck for holding a tap,
a holder body for holding the chuck so that the chuck is slidable, along a rotational axis with respect to the holder body and rotatable in synchronism with the holder body, defining a lead end side at which the tap is positioned and a rear end side at which the holder body is positioned in the rotational axis,
elastically deforming members that are deformable,
  one of which being disposed at the rear end side compared with the other deforming member and being deformed when a tension force is applied to the tap along the rotational axis, the tension force being defined as a force that stretches the chuck while detaching the tap from an object that has been machined, and the one deforming member being defined as a rear deforming member (31), and
  the other of which being disposed at the leading end side compared with the one deforming member and being deformed when a compression force is applied to the tap along the rotational axis, the compression force being defined as another force directing in an opposite direction from the tension force that compresses the chuck while the tap machines the object, and the other deforming member being defined as a leading deforming member (33), wherein
the rear deforming member is disposed defined between a pressure receiving face (30A) of the chuck and a pressure receiving face (25B) of the holder body in a contacting manner with the pressure receiving faces, the pressure receiving faces being faced one another and spaced with a predetermined length,
one of the pressure receiving faces is formed perpendicular relative to the rotational axis, and the other one thereof is formed with an inclination in the rotational axis so that a deformation amount (L1) of the rear deforming member along the rotational axis is smaller than an amount of displacement (X2) of the chuck along the rotational axis.

* * * * *